United States Patent
Baracca et al.

(10) Patent No.: US 11,387,930 B2
(45) Date of Patent: Jul. 12, 2022

(54) RADIO JAMMING DETECTION

(71) Applicant: NOKIA SOLUTIONS AND NETWORKS OY, Espoo (FI)

(72) Inventors: Paolo Baracca, Stuttgart (DE); Thorsten Wild, Stuttgart (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/235,169

(22) Filed: Apr. 20, 2021

(65) Prior Publication Data
US 2021/0344437 A1    Nov. 4, 2021

(30) Foreign Application Priority Data
Apr. 29, 2020   (FI) .................................... 20205440

(51) Int. Cl.
*H04K 3/00* (2006.01)
*H04B 17/345* (2015.01)
(Continued)

(52) U.S. Cl.
CPC ............. *H04K 3/22* (2013.01); *H04B 17/345* (2015.01); *H04J 11/0023* (2013.01);
(Continued)

(58) Field of Classification Search
CPC ..... H04K 3/22; H04B 17/345; H04J 11/0023; H04J 11/0056; H04L 5/0005; H04W 72/04; H04W 72/082; H04W 72/042
See application file for complete search history.

(56) References Cited

U.S. PATENT DOCUMENTS

| 8,358,979 B2 | 1/2013 | Astely et al. |
| 9,451,627 B1 | 9/2016 | Zhu et al. |
| (Continued) | | |

FOREIGN PATENT DOCUMENTS

| CN | 102550107 A | 7/2012 |
| JP | 2013-509011 A | 3/2013 |
| (Continued) | | |

OTHER PUBLICATIONS

Communicaton of Acceptance under section 29a of Patents Decree dated Mar. 16, 2021 corresponding to Finnish Patent Application No. 20205440.
(Continued)

*Primary Examiner* — Jeffrey M Rutkowski
*Assistant Examiner* — Jasper Kwoh
(74) *Attorney, Agent, or Firm* — Squire Patton Boggs (US) LLP

(57) ABSTRACT

There is provided a method for a first network element of a wireless communication network, the method comprising: obtaining blanked subcarrier index data indicating one or more blanked subcarriers in a time-frequency resource grid; initiating reception of a transmission from a second network element of the wireless communication network on said time-frequency resource grid; causing performing an interference measurement on said one or more blanked subcarriers to obtain interference measurement data on said one or more blanked subcarriers; and outputting the interference measurement data for detecting a presence of radio jamming.

12 Claims, 10 Drawing Sheets

(51) Int. Cl.
*H04L 5/00* (2006.01)
*H04W 72/04* (2009.01)
*H04W 72/08* (2009.01)
*H04J 11/00* (2006.01)

(52) U.S. Cl.
CPC ........ *H04J 11/0056* (2013.01); *H04L 5/0005* (2013.01); *H04W 72/04* (2013.01); *H04W 72/082* (2013.01); *H04W 72/042* (2013.01)

(56) References Cited

U.S. PATENT DOCUMENTS

| | | | |
|---|---|---|---|
| 2002/0191690 A1* | 12/2002 | Pendergrass | H04L 25/4902 375/239 |
| 2006/0098715 A1 | 5/2006 | Amano | |
| 2006/0188003 A1* | 8/2006 | Larsson | H04B 1/719 375/130 |
| 2007/0116093 A1* | 5/2007 | Karlsson | H04K 3/42 375/130 |
| 2009/0130979 A1 | 5/2009 | Bhushan et al. | |
| 2014/0160958 A1 | 6/2014 | Astely et al. | |
| 2014/0198678 A1 | 7/2014 | Kim et al. | |
| 2015/0124733 A1 | 5/2015 | Lim et al. | |
| 2015/0208410 A1 | 7/2015 | Koutsimanis et al. | |
| 2017/0041822 A1* | 2/2017 | Thommana | H04W 72/0453 |
| 2017/0272222 A1* | 9/2017 | Froberg Olsson | H04L 5/0048 |
| 2018/0035416 A1* | 2/2018 | Yi | H04W 72/0406 |

FOREIGN PATENT DOCUMENTS

| | | |
|---|---|---|
| WO | 2008/052194 A2 | 5/2008 |
| WO | 2009/098578 A2 | 8/2009 |
| WO | WO 2011/035340 A1 | 3/2011 |
| WO | 2020/063741 A1 | 4/2020 |

OTHER PUBLICATIONS

Office Action and Search Report dated Nov. 13, 2020 corresponding to Finnish Patent Application No. 20205440.
Extended European Search Report dated Sep. 28, 2021 corresponding to European Patent Application No. 21168322.2.
Jorge Querol et al., "An anti-jamming system for GNSS timing applications," 2018 European Frequency and Time Forum (EFTF), IEEE, Apr. 10, 2018, pp. 155-158, XP033374535.
Notification of Reasons for Rejection (non-final) dated Sep. 21, 2021 corresponding to Japanese Patent Application No. 2021-075946, with English Summary thereof.
Notification of the First Office Action dated Mar. 4, 2022 corresponding to Chinese Patent Application No. 2021104888676, with English summary thereof.

* cited by examiner

RADIO JAMMING DETECTION

CROSS REFERENCE TO RELATED APPLICATION

This application claims priority from Finnish Patent Application No. 20205440, filed Apr. 29, 2020. The contents of this application are hereby incorporated by reference.

TECHNICAL FIELD

The invention relates to communications.

BACKGROUND

Malicious activities may cause, for example, performance and integrity issues to a communications system. One example of such malicious activity is radio jamming which may be performed by one or more radio jammers that intentionally inject interference to a communications system with the purpose of decreasing performance of the system. Therefore, providing solutions for radio jamming problems may prove helpful in maintaining the performance of the communications system.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

According to an aspect there is provided an apparatus for a first network element of a wireless communication network, the apparatus comprising means for performing: obtaining blanked subcarrier index data indicating one or more blanked subcarriers in a time-frequency resource grid; initiating reception of a transmission from a second network element of the wireless communication network on said time-frequency resource grid; causing performing an interference measurement on said one or more blanked subcarrier to obtain interference measurement data on said one or more blanked subcarriers; and outputting the interference measurement data for detecting a presence of radio jamming.

In an embodiment, the blanked subcarrier index data is generated utilizing a pseudorandom algorithm information determined by a control network element of the wireless communication network.

In an embodiment, the means are configured to transmit the interference measurement data for detecting the presence of radio jamming to at least one of said control network element, said second network element.

In an embodiment, the means are configured to perform the detecting of the presence of radio jamming based on the outputted interference measurement data.

In an embodiment, the blanked subcarrier index data indicates one or more blanked subcarriers in a plurality of radio symbols for communicating between the first and second network elements.

In an embodiment, the means are configured to receive the pseudorandom algorithm information from the control network element and to determine the blanked subcarrier index data based on the received pseudorandom algorithm information.

In an embodiment, the means are configured to receive an update message from the control network element, the update message for updating the pseudorandom algorithm information.

In an embodiment, the first network element comprises a network node and the second network element comprises a user equipment, and wherein the means are configured to: schedule, based on the obtained blanked subcarrier index data, the user equipment to blank transmission on the one or more blanked subcarriers.

In an embodiment, the one or more blanked subcarriers denote one or more blanked physical resource blocks.

According to an aspect, there is provided an apparatus for a control network element of a wireless communication network, the apparatus comprising means for performing: determining a blanking pattern information for blanking one or more subcarriers of a time-frequency resource grid; configuring a plurality of network nodes of the wireless communication network to utilize said blanking pattern information to blank the one or more subcarriers; receiving interference information from a network node of the plurality of network nodes, the interference information obtained based on one or more measurements performed on the one or more blanked subcarriers; determining a presence of radio jamming based on the received interference information; and in case the presence of radio jamming is determined, initiating one or more actions to mitigate the determined radio jamming.

In an embodiment, the blanking pattern information comprises a pseudorandom algorithm.

In an embodiment, the interference information received from the network node of the plurality of network nodes indicates whether or not the network node has detected interference on the one or more blanked subcarriers.

In an embodiment, the indication whether or not the network node has detected interference is based on interference measurement data on the one or more blanked subcarriers received by the network node from at least one user equipment.

In an embodiment, the interference information comprises interference measurement data obtained by at least one of the network node of the plurality of network nodes, a user equipment served by the network node of the plurality of network nodes, and wherein the means are configured to detect the presence of radio jamming based on said interference measurement data.

In an embodiment, the one or more blanked subcarriers denote one or more blanked physical resource blocks.

In an embodiment, said means comprise at least one processor, and at least one memory including computer program code.

According to an aspect, there is provided a method for a first network element of a wireless communication network, the method comprising: obtaining blanked subcarrier index data indicating one or more blanked subcarriers in a time-frequency resource grid; initiating reception of a transmission from a second network element of the wireless communication network on said time-frequency resource grid; causing performing an interference measurement on said one or more blanked subcarriers to obtain interference measurement data on said one or more blanked subcarriers; and outputting the interference measurement data for detecting a presence of radio jamming.

According to an aspect, there is provided a method for a control network element of a wireless communication network, the method comprising: determining a blanking pattern information for blanking one or more subcarriers of a time-frequency resource grid; configuring a plurality of network nodes of the wireless communication network to utilize said blanking pattern information to blank the one or more subcarriers; receiving interference information from a network node of the plurality of network nodes, the interference information obtained based on one or more measurements performed on the one or more blanked subcarriers; determining a presence of radio jamming based on the received interference information; and in case the presence of radio jamming is determined, initiating one or more actions to mitigate the determined radio jamming.

According to an aspect, there is provided a computer readable medium comprising program instructions for causing an apparatus at least to perform: obtaining, in a first network element of a wireless communication network, blanked subcarrier index data indicating one or more blanked subcarriers in a time-frequency resource grid; initiating reception of a transmission from a second network element of the wireless communication network on said time-frequency resource grid; causing performing an interference measurement on said one or more blanked subcarriers to obtain interference measurement data on said one or more blanked subcarriers; and outputting the interference measurement data for detecting a presence of radio jamming.

According to an aspect, there is provided a computer readable medium comprising program instructions for causing an apparatus at least to perform: determining, in a control network element of a wireless communication network, a blanking pattern information for blanking one or more subcarriers of a time-frequency resource grid; configuring a plurality of network nodes of the wireless communication network to utilize said blanking pattern information to blank the one or more subcarriers; receiving interference information from a network node of the plurality of network nodes, the interference information obtained based on one or more measurements performed on the one or more blanked subcarriers; determining a presence of radio jamming based on the received interference information; and in case the presence of radio jamming is determined, initiating one or more actions to mitigate the determined radio jamming.

According to some embodiments, the invention can include a system comprising a combination of the apparatuses discussed above.

BRIEF DESCRIPTION OF DRAWINGS

In the following some embodiments will be described with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1A:
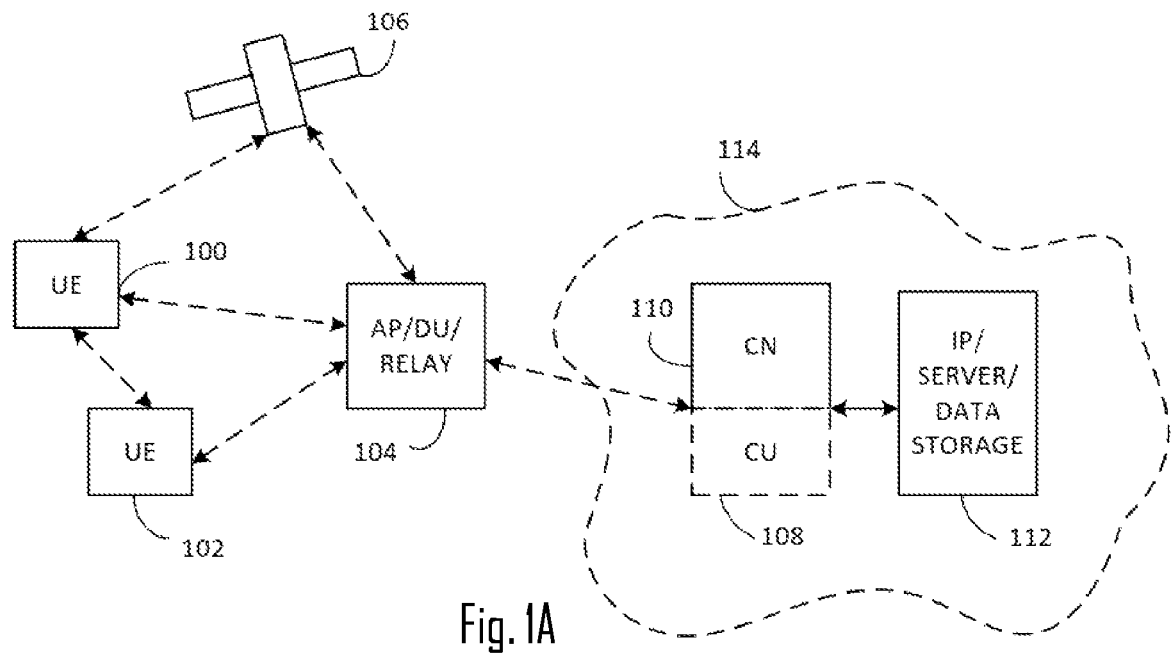
FIG. 1A illustrates an example of a wireless communication system to which embodiments may be applied.

FIG. 1A depicts examples of simplified system architectures only showing some elements and functional entities, all being logical units, whose implementation may differ from what is shown. The connections shown in FIG. 1A are logical connections; the actual physical connections may be different. It is apparent to a person skilled in the art that the system typically comprises also other functions and structures than those shown in FIG. 1A.

The embodiments are not, however, restricted to the system given as an example but a person skilled in the art may apply the solution to other communication systems provided with necessary properties.

The example of FIG. 1A shows a part of an exemplifying radio access network. FIG. 1A shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1A) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1A by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1A may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1A). A HNB Gateway (HNB-GW), which is typically installed within an operator's network may aggregate traffic from a large number of HNBs back to a core network.

Radio jamming by a malicious device is a type of security attack that can threaten the performance a communication system, such as the system described above with reference to FIG. 1A. In detail, a radio jammer is a malicious device that intentionally injects interference without necessarily transmitting any information. Purpose of such action may be to perform a denial-of-service (DoS) attack. There exists different types of radio jammers from basic devices, that just transmit power on some narrow- or wide-bands, to more advanced reactive devices which may stay quiet while the channel(s) is inactive and start transmitting in response to detecting transmission on the channel(s). Such reactive radio jammers may even send a radio jamming signal in the format of a standardized packet, i.e., a packet that is compliant with the standard used on that radio band or channel. Radio jammers may be available for different radio bands, such as bands for 2G to 5G cellular bands, WiFi, Bluetooth, and different satellite positioning standards (e.g. Global Positioning System (GPS), Global Navigation Satellite System (Glonass).

While radio jamming may only have been considered as a rather limited threat for mobile communications systems up to LTE by traditional customer service providers (CSPs), essentially because jamming is illegal in most countries and a radio jammer would have just limited the performance of the few devices around it, a radio jammer can have a much stronger negative impact in vertical markets, for instance when 5G is deployed for factory automation or vehicular-to-everything (V2X) communications. In factory automation, even if it is assumed that no malicious device can be activated inside a plant or a factory hall, it might happen that a radio jammer, stationed outside the plant, is active and tries blocking the transmission of some legitimate devices inside the plant. As the reliability and availability requirements of the industrial use case may be rather extreme, the sensitivity of the system for not being able to deliver sufficient service quality may also be high when even moderate levels of jamming are used: The factory owner can face huge economic losses if those attacks eventually succeed in pausing the production. Example of such closed system is shown in FIG. 1B which may be a similar or same system as described with reference to FIG. 1A.

Figure 1B:
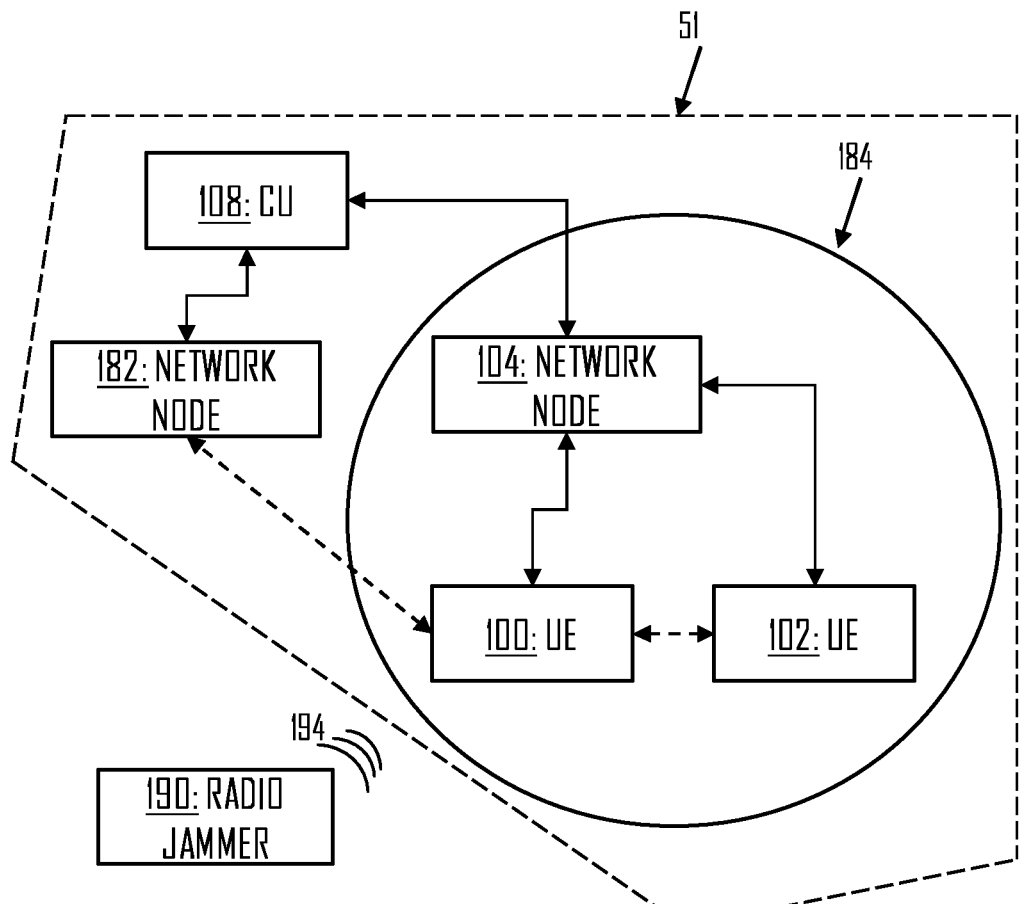
FIG. 1B illustrates an example of a wireless communication system to which embodiments may be applied.

Referring to FIG. 1B, CU 108 in communication with network nodes 104, 182 is shown. Network node 182 may be similar to node 104 which was discussed above in more detail. For example, CU/DU-split may be used, or CU and DU may be located in the same physical and/or logical device. For example, in case CU/DU split is used, CU-DU communication may be realized via F1 interface. As shortly discussed above, it is also possible to use an alternative architecture in which one of the nodes 104, 182 realizes the role of CU 108, in a master-slave principle, so that the node that has the CU role is a master of other nodes (e.g. DUs) in the system or network. In such case, the communication between different network elements may be realized via Xn interface.

CU 108 may control the nodes 104, 182, and nodes 104, 182 may provide services within a geographically restricted area 51. Such area may be, for example, plant or factory area. In the example of FIG. 1B, service is provided by network node 104 in the area of radio cell 184 to UEs 100, 102. At this point it is highlighted that although only two UEs and two nodes are shown, there may be more than two of said devices depending on system implementation and required service level, for example. It is further noted that dotted lines between UE 100 and node 182 and UEs 100, 102 may depict possible additional or alternative communication links (e.g. multi-connectivity scenario(s) or cell change).

As shown in FIG. 1B, radio jammer 190 transmits radio jamming signal 194 outside the restricted area 51. The radio jamming signal 194 may cause the performance of the communication system to deteriorate. For example, the provided service level may decrease or the service may be totally stopped. According to an embodiment, the radio jammer 190 is a reactive radio jammer 190.

It is noted at this point that radio jamming may differ from general interference caused by e.g. other devices of the system. For example, legitimate device (e.g. UE or network node, such as AP or DU) may create interference respecting the standard rules, such as timing, power and/or scheduling. However, a radio jammer is a malicious device that intentionally attacks the system and its activity can be extremely dangerous: smart jamming attacks can bring a network down even with a small jamming activity. It needs to be understood that the purpose of radio jamming may be to perform the radio jamming so that it is hard to be detected and mitigated. Therefore, radio jammer may not follow any standard timing, power and/or scheduling rules. Thus, there may be a need to provide solutions targeted for decreasing problem(s) created by radio jammers. In particular, such solutions may be beneficial for private cellular network (e.g. private 5G networks), but same solutions may be applicable to different types of wireless communication networks and systems. Therefore, there is proposed a radio jamming detection solution which may be utilized in wireless communication networks for detecting a presence of radio jamming.

In an embodiment, the wireless network described with reference to FIGS. 1A and 1B is a cellular network. The cellular network may be a private cellular network, wherein the same blanked subcarrier index data is shared amongst a plurality of network elements of the private cellular network. The proposed solution may be particularly suitable for a private 5G network scenario where a set of J network nodes communicate with K UE devices, with a CU coordinating the activity of all these network nodes. For instance, the solution may be applied to any Industry 4.0 scenario, where a vertical player decides to deploy its own 5G private network on its factory plants and/or production sites.

Figure 2:
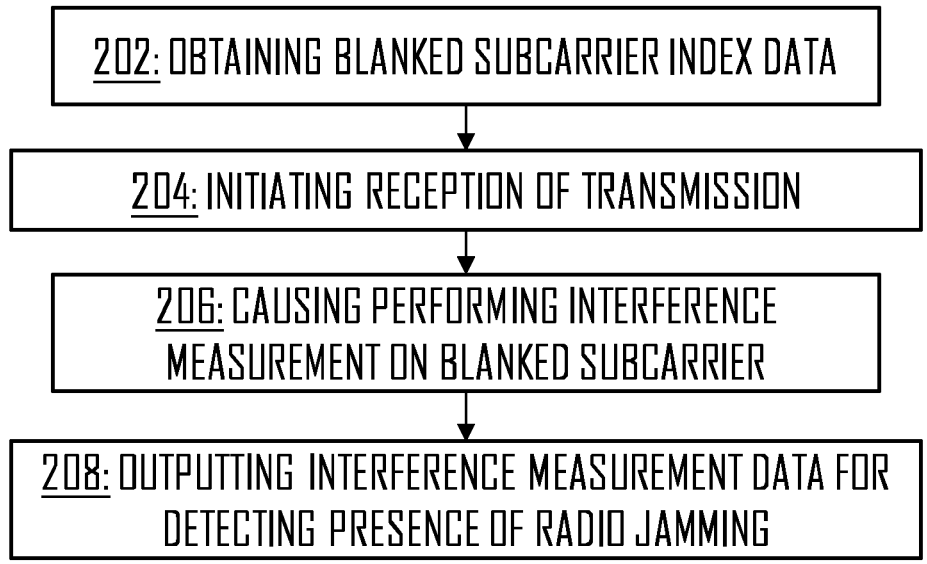
FIGS. 2 and 3 illustrate flow diagrams according to some embodiments.

FIG. 2 illustrates a flow diagram according to an embodiment. Referring to FIG. 2, a method in a first network element of a wireless communication network is provided, the method comprising: obtaining blanked subcarrier index data indicating one or more blanked subcarriers in a time-frequency resource grid (block 202); initiating reception of a transmission from a second network element of the wireless communication network on said time-frequency resource grid (block 204); causing performing an interference measurement on said one or more blanked subcarriers to obtain interference measurement data on said one or more blanked subcarriers (block 206); and outputting the interference measurement data for detecting a presence of radio jamming (block 208).

Figure 3:
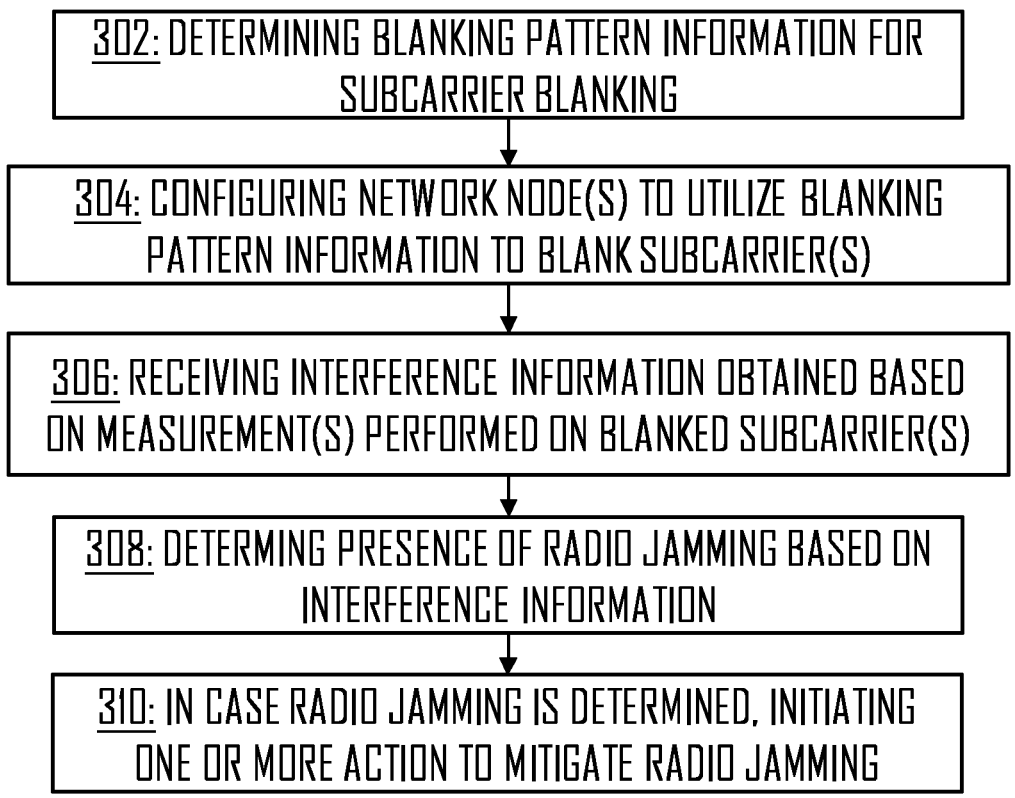

FIG. 3 illustrates a flow diagram according to an embodiment. Referring to FIG. 3, a method in a control network element of a wireless communication network is provided, the method comprising: determining a blanking pattern information for blanking one or more subcarriers of a time-frequency resource grid (block 302); configuring a plurality of network nodes of the wireless communication network to utilize said blanking pattern information to blank the one or more subcarriers (block 304); receiving interference information from a network node of the plurality of network nodes, the interference information obtained based on the one or more measurements performed on the one or more blanked subcarriers (block 306); determining a presence of radio jamming based on the received interference information (block 308); and in case the presence of radio jamming is determined, initiating one or more actions to mitigate the determined radio jamming (block 310).

Thus, for example, the proposed solution may be utilized for initiate actions targeted to mitigate possibly detected radio jamming. For example, such mitigative actions may comprise one or more of the following methods (but not limited to):

Direct sequence spread spectrum, by signal spreading and de-spreading;
Frequency hopping spread spectrum, by hopping carrier on the system band;
Beamforming, by applying weights at the antennas to steer beams in proper direction;
Power control, by increasing the transmit power;
Link adaptation, by using more robust QAM constellation sizes and coding schemes;
Alarm output, such as alarming authorities.

The described methods may be applicable in the system(s) of FIGS. 1A and 1B, for example. The first network element discussed with respect to FIG. 2 may be, for example, network node 104, UE 100, or UE 102, or some other similar network device. Similarly, the second network element may refer to network node 104, UE 100, or UE 102. For example, if the first network element is network node 104, the second network element may be UE 100 or UE 102. For example, if the first network element is UE 100 or UE 102, the second network element may be network node 104. The control network element discussed with respect to FIGS. 2 and 3 may refer to, for example, CU 108 or similar control unit of the wireless communication network. Configuring the plurality of network nodes in step 304 may refer to configuring, for example, by the CU 108 the network nodes 104, 182. The plurality of network nodes may comprise two or more network nodes. For example, the plurality of network nodes may refer to all network nodes controlled by the CU 108. It is also possible that the system comprises more than one CU. In such case it is possible that the communication is further coordinated between the different CUs so that the same subcarriers may be blanked in all network nodes controlled by the CUs.

In an embodiment, the first network element is the UE 100 or UE 102.

In an embodiment, the first network element is the network node 104.

In an embodiment, the control network element is the CU 108.

A time-frequency resource grid may refer, for example, to radio symbol or radio symbols, such as OFDM symbol(s), which are used as examples herein. However, the proposed solution may be applicable to other type of systems than only radio symbol-based systems (e.g. OFDM modulation utilizing systems). Thus, the different examples and embodiments described as with radio symbols or OFDM symbols may be applicable to systems utilizing different type of time-frequency resource allocation. Thus, for example, the blanked of the one or more subcarriers may be blanked subcarrier(s) of a radio symbol, such as OFDM symbol.

According to an embodiment, the blanked subcarrier index data (e.g. obtained in block 202) is generated utilizing a pseudorandom algorithm information determined by a control network element (e.g. CU 108) of the wireless communication network. This is discussed below in more detail.

According to an embodiment, the blanking pattern information comprises or refers to pseudorandom algorithm. Hence, block 302 may comprise determining the pseudorandom algorithm and block 304 configuring the network node(s) to utilize said pseudorandom algorithm in blanking the subcarrier(s). Alternatively, the blanking pattern information may indicate, for example, directly the subcarriers that need to be blanked. These may, for example, follow a pseudorandom pattern.

Detecting jamming attacks may be challenging because it involves distinguishing malicious behaviors from legitimate conditions (e.g. cellular interference or fading) that cause poor performance. Therefore, the proposed solution of blanking a certain number of subcarriers may be beneficial in trying to detect the radio jamming activity. Let us consider one example with reference to FIG. 4A. Let us assume that devices in the described system communicate use orthogonal frequency-division multiplexing (OFDM) modulation, with an OFDM symbol comprising N subcarriers. It is noted that the system may utilize different modulation and different radio symbol(s) than OFDM modulation and OFDM symbol. However, due to simplicity reasons, OFDM symbol is used as an example throughout the description. The provided examples and embodiments may be applicable to non-radio symbol based systems and/or to systems utilizing some other type of radio symbols than OFDM symbols, for example. According to an embodiment, the radio symbol discussed herein refers to OFDM symbol.

Figure 4A:
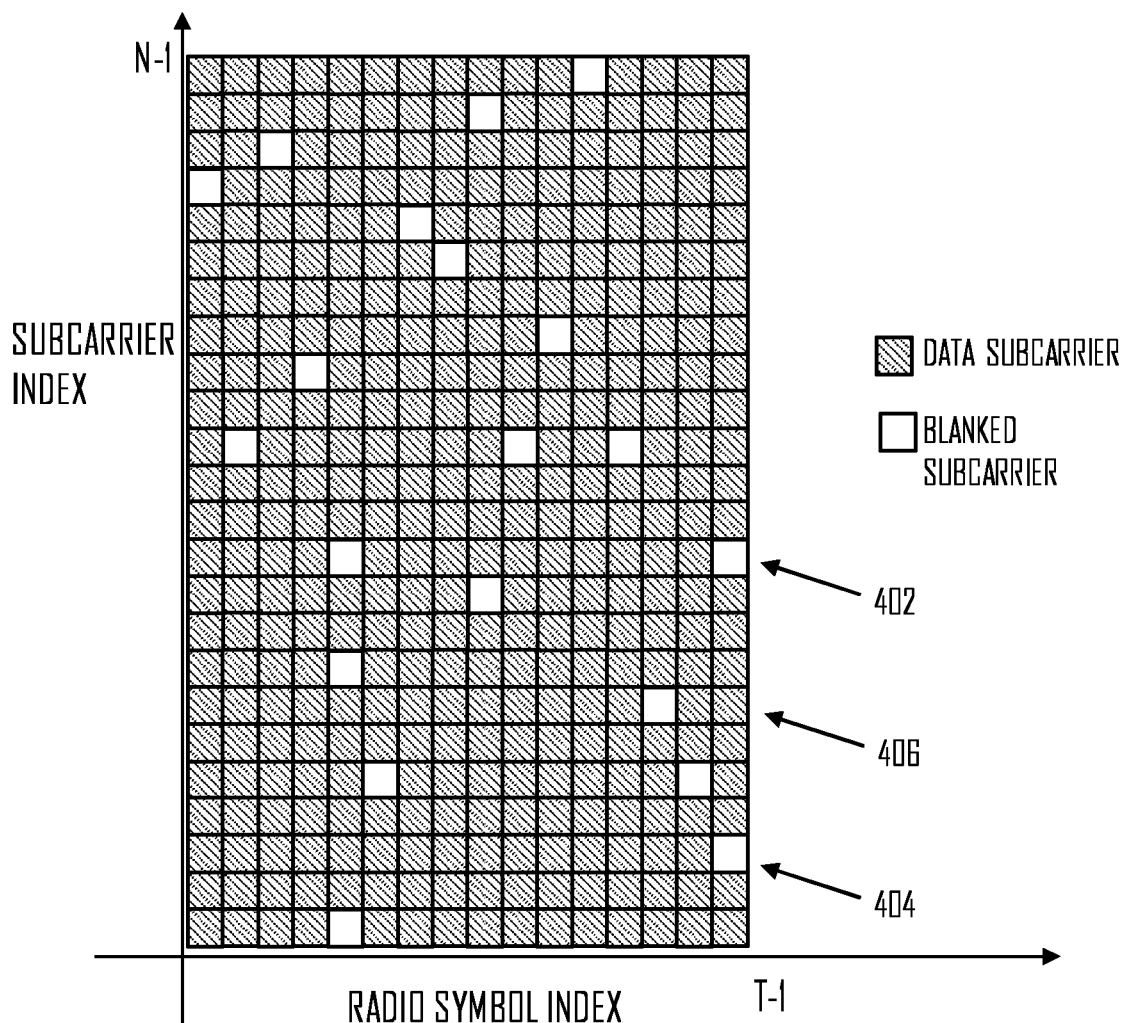
FIG. 4A illustrates a subcarrier blanking pattern according to an embodiment.

As shown in FIG. 4A, one or more subcarrier(s) in OFDM symbols are blanked (i.e. blanked subcarriers 402, 404 show with white background whereas non-blanked subcarriers 406 have pattern filling). Non-blanked subcarriers 406 may refer to data subcarriers used to transmit user plane and/or control plane data in the system. As shown in the example, one to three subcarriers per OFDM symbol are blanked. These numbers are exemplary and may differ depending on implementation. For example, it is possible that no subcarriers are blanked in a certain OFDM symbol or that more than three subcarriers are blanked in a certain OFDM symbol. Blanked subcarrier may refer to a subcarrier that is not used to transmit a transmission. I.e. it is empty in the sense that the different network elements, that are configured to blank those subcarriers, may not use said subcarriers for transmitting data. Thus, the network elements may assume that there should be no transmission(s) on those blanked subcarriers, and that detected/measured power should originate either from interference or radio jamming.

The radio jammer may detect which subcarriers are blanked in each OFDM symbol, but, thanks to the usage of pseudo-random algorithms to decide which subcarriers are blanked in each OFDM symbol, may not predict in advance which subcarriers will be blanked in the following OFDM symbol(s). Thus, it may transmit on said blanked subcarriers, and thus the methods described herein may be used to detect the radio jamming signal on those blanked subcarriers. So, even if the radio jammer is reactive, when it starts transmitting (for instance on the whole signal band), it will transmit also on those blanked subcarriers. The generated interference may be observed by the receivers, and the radio jammer may be detected. The detection may further comprise distinguishing the radio jamming signal from thermal noise. So, the control network element may configure all transmitters to utilize the pseudorandom blanking pattern so that there are no transmissions on said blanked subcarriers. It needs to be understood that the control network element does not necessarily, in all cases and implementations, control all transmitters, and thus it is possible that there may be legitimate interference on those blanked subcarriers. However, for example, the control network element may control all known transmitters and/or transmitters in a certain restricted area (e.g. area 51) which may suffice well for the radio jamming detection purpose.

Interference measurement and interference measurement data should be understood broadly in the sense that such measurements may be, for example, standard power or signal strength measurements, but which are performed on the blanked subcarriers. So, the purpose of those interference measurements may be to detect and measure radio jamming, and thus those measurement(s) could be understood as radio jamming measurement(s). One example of interference measurement value in this context may be interference power value (IPV) which may be measured by the network node 104, 182 or UE 100, 102, for example.

As noted in the example embodiment discussed with reference to FIG. 4A, a pseudorandom blanking pattern may be used to blank the subcarriers. Difference between random and pseudorandom is understood by the skilled person, but in short terms pseudorandom pattern is a random pattern that is controlled by a process (e.g. computer process, such as an algorithm) that outputs random outputs in an expected manner. For example, if same pseudorandom algorithm (e.g. including pseudorandom generator and seed) is given to two different network nodes, both nodes may compute same pseudorandom blanking pattern based on the provided algorithm. With a random algorithm, both network nodes would most likely end up with different blanking patterns, and thus there would be legitimate transmissions on those subcarriers that should have been blanked. Hence, pseudorandom blanking pattern may be obtained via the pseudorandom algorithm. As noted in block 202, blanked subcarrier index data may be obtained by the first network element. The obtaining may comprise receiving the blanking pattern from the control element or from the second network element, or it may comprise receiving the pseudorandom algorithm information based on which the first network element may compute or determine the blanking pattern, and thus obtain the blanked subcarrier index data. The blanked subcarrier index data may indicate which subcarrier(s) in one or more OFDM symbol are blanked.

According to an embodiment, the pseudorandom algorithm information comprises a pseudorandom generator and a seed.

Figure 4B:
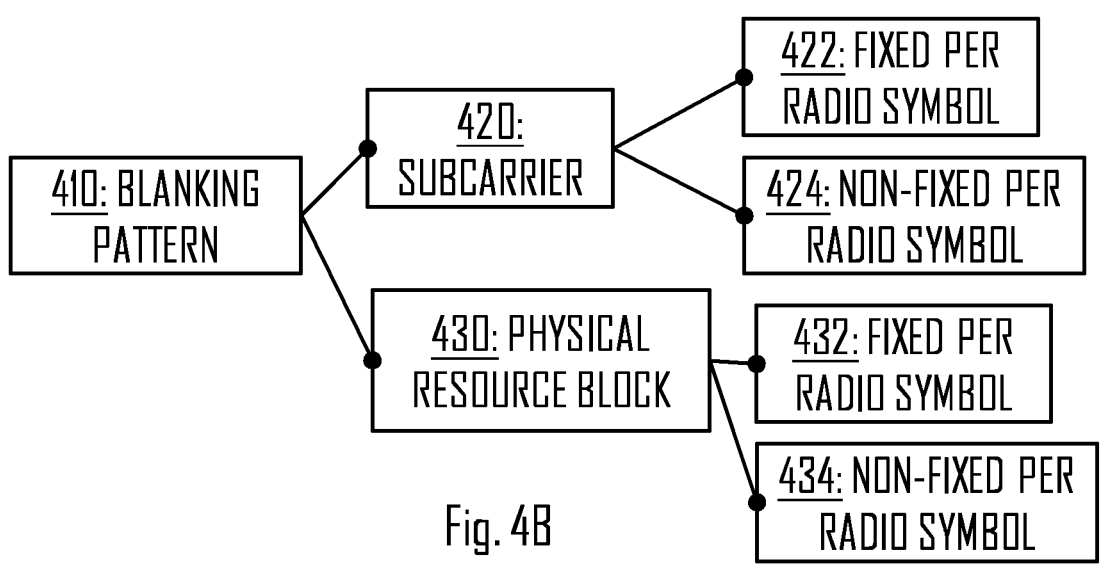
FIG. 4B illustrates blanking patterns according to some embodiments.

There may be different ways to blank the subcarrier(s) as shown in some embodiments indicated in FIG. 4B. These different blanking ways may understood as different blanking patters. As discussed above, the pseudorandom blanking pattern 410 (or simply blanking pattern) may be indicated by the blanked subcarrier index data and may be obtained via the pseudorandom algorithm. Therefore, different pseudorandom algorithm (e.g. different generator and/or seed) may cause the blanking pattern to change or to be different.

In an embodiment, the one or more blanked subcarriers comprises one or more blanked physical resource blocks (PRB) 430. This may mean that the one or more blanked subcarriers denote one or more blanked PRBs. Thus, in this embodiment, the blanking may be performed such that one or more PRB is blanked. In some systems, e.g. in LTE and NR, the smallest time-frequency resource unit used for downlink/uplink transmission may be referred to as a resource element (RE). One RE may be one subcarrier over one OFDM/single-carrier frequency-division multiple access scheme (SC-FDMA) symbol. Hence, as used in this application, the one or more blanked subcarriers comprise the blanking of one or more REs and one or more PRBs as one PRB may comprise a plurality of REs. For example, in NR, PRB may comprise 12 subcarriers.

For example, a fixed number 432 of PRBs or non-fixed number 434 of PRBs in each radio symbol (e.g. OFDM symbol) may be blanked. Fixed number could mean, for example, that one PRB is blanked in each radio symbol whereas the non-fixed number may mean that the number of PRBs blanked in each radio symbol may be different. The non-fixed number may be random or pseudorandom number.

In an embodiment, the one or more blanked subcarriers 420 comprises blanked subcarriers in a plurality of radio symbols (e.g. see FIG. 4A).

In an embodiment, a number of the blanked one or more subcarriers in a radio symbol is the same 422 (i.e. fixed) in each of the plurality of radio symbols.

In an embodiment, a number of the blanked one or more subcarriers in a radio symbol is random or pseudorandom 424 in each of the plurality of radio symbols. This could mean, for example, that there may be an OFDM symbol with 1 blanked subcarrier, followed by an OFDM symbol with 3 blanked subcarriers etc.

Figure 4C:
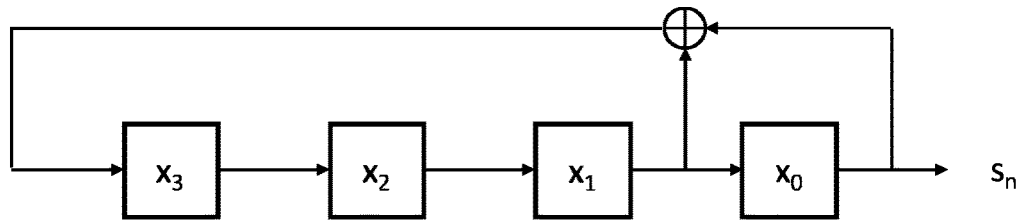
FIG. 4C illustrates a pseudorandom algorithm according to an example embodiment.

FIG. 4C illustrates a pseudorandom generator according to an example embodiment. Referring to FIG. 4C, in order to generate a sequence of subcarriers blanked in each OFDM symbol, a pseudo random generator may be used. One simple example is given by the depicted maximum length sequence (MLS) generator, which allows to generate a pseudorandom sequence $s_n$ of $2^L-1$ bits by using a shift register of length L. For example, in FIG. 4C L is selected to be 4. It is noted that with MLS the sequence $s_n$ is uniquely defined by the initial sequence $x_0, x_1, \ldots, x_{L-1}$. FIG. 4C is provided as an illustrative example of how to generate pseudorandom blanking pattern. However, some other type of pseudorandom algorithm known in the art may be used.

Figure 5:
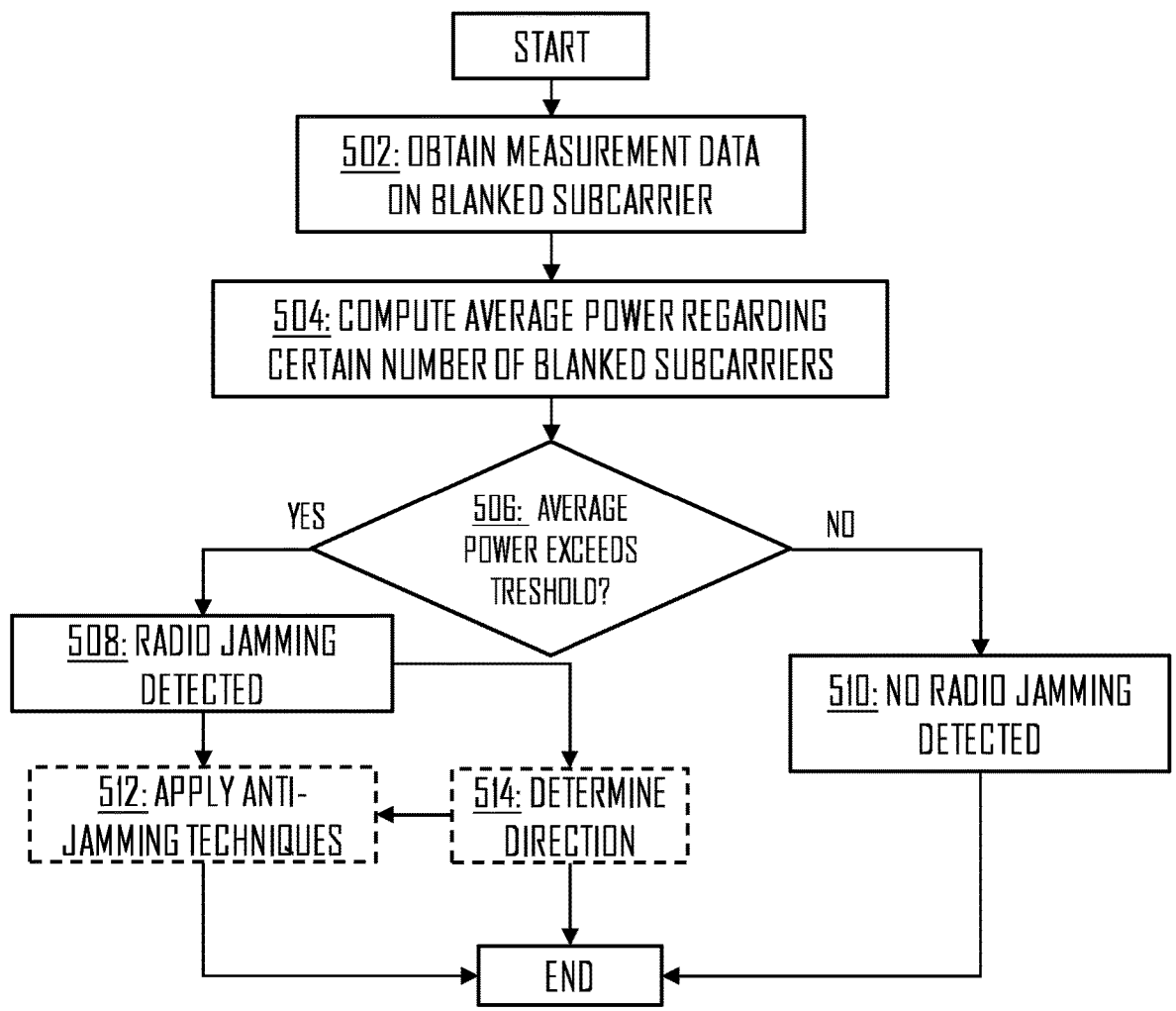
FIGS. 5, 6A, 6B, 7A, 7B, and 7C illustrate some embodiments.

Let us then look at FIG. 5 illustrating an embodiment. Referring to FIG. 5, in block 502, the first network element (e.g. network node or UE) may obtain measurement data on one or more blanked subcarriers. For example, the first network element may perform the interference measurement(s) to obtain said data or it may receive said data from e.g. second network element that has performed the measurement(s). The measurement data may comprise, for example, power measurement data (e.g. IPV). So, the measurement may comprise, for example, measuring received signal power. Measured power on the i-th blanked subcarrier may be denoted with $P_i$, where i denotes the blanked subcarrier index. So, for example if there are three blanked subcarriers, i would get values 1, 2, and 3.

In block 504, average power P regarding a certain number of blanked subcarriers may be computed. This step may be performed by first network element, second network element or by the control network element (see e.g. FIGS. 6A to 7C). Said certain number may be denoted with M. Parameter M may be selected by the system, for example. It is noted that more than M number of subcarriers may be blanked, but the average power may still be calculated based on M number of subcarriers.

According to an embodiment, interference measurement data on all blanked subcarriers of a certain radio symbol is used for determining whether or not there is radio jamming present. So, for example, if there are 3 (three) subcarriers blanked in a certain radio symbol, and M is at least 3 (three), then measurements regarding all blanked subcarriers is taken into consideration when determining the presence of radio jamming. It may be beneficial to select M so that all blanked subcarriers of a certain radio symbol are considered at a time so that the blanking is not performed in vain. For example, if there are 3 (three) subcarriers blanked in the next radio symbol, M would need to equal 6 (six) in order to have also the measurement data on those blanked subcarriers taken into account. As the number of M increases, so does the time needed to perform the average power determination as it may be necessary to receive further radio symbols. So, in general, according to an embodiment, all blanked subcarriers of a radio symbol are considered at a time, and more particularly the interference measurement data on all said subcarriers is used for determining the average power. However, as noted, even though all subcarriers of a radio symbol may be considered at a time, this may not mean that all blanked subcarriers are used for the determination as these may be spread over a multiple radio symbols, and increase the number of radio symbols to be considered may increase latency of the determination. Hence, selecting higher M may increase accuracy of the radio determination, but on the other hand may increase latency.

In block 506, if the average power P exceeds a threshold, it may be determined that there is radio jamming present and the process may continue to bock 508. Otherwise, the process may continue to block 510 (i.e. no radio jamming detected). Block 506 may be performed by first network element or by the control network element, for example. These different options are discussed with respect to FIGS. 6A, 6B, 7A, 7B, and 7C.

Additionally, in block 512 anti-jamming techniques (e.g. discussed above) may be applied if radio jamming is detected. Anti-jamming may be initiated, for example, at the control network element.

So, going into some details, after the subcarrier(s) have been blanked, and interference measured, for a subcarrier there may be two different possibilities according to statistical hypothesis testing:

Hypothesis 0: there is no radio jamming and there may only be thermal noise (whose power P(w) may be assumed to be known). For example, the thermal noise may be measured on other subcarriers, i.e. which are not blanked. As noise is a random process, note that the power measured on a single subcarrier without radio jamming may be different from P(w) However, computing the thermal noise may still be performed (e.g. at first network element, second network element or at the control network element).

Hypothesis 1: there is radio jamming.

Then average power P over the M blanked subcarriers may be computed in block 504 as follows:

$$P = \frac{1}{M}\sum_{i=0}^{M-1} P_i$$

Now in block 506 the average power may be compared with $\beta P^{(W)}$, where $\beta$ may be a parameter depending on the target false alarm and missed detection probabilities. False alarm may denote a situation where radio jamming was detected but there was no radio jammer present and active, and missed detection may refer to an event in which radio jamming was not detected but radio jammer was present and active. So, if $P \geq \beta P^{(W)}$, it may be determined that there is radio jamming and the process may continue to block 508. In this case, the mentioned threshold may be $\beta P^{(W)}$, i.e. thermal noise power estimation multiplied by parameter $\beta$.

Detection theories are familiar with the use of parameter β, and it will not be discussed herein in detail. One way to compute β is to assume that the noise is substantially White Gaussian in which case we may derive the following expressions:

$$P_{FA} = 1 - F_{\chi^2_{2M}}(2M\beta)$$

$$\beta = \frac{1}{2M} F^{-1}_{\chi^2_{2M}}(1 - P_{FA})$$

where $F_{\chi_{2M}^2}(\ )$ is the cumulative distribution function (CDF) of a chi-squared random variable with 2M degrees of freedom, and $P_{FA}$ indicates the target false alarm probability. The target false alarm probability may be network configured predetermined parameter, or it may be a parameter that the control network element or network node determines, for example. It is noted that if the noise is not White Gaussian, additional parameters may be used to enhance the estimation.

It is noted that M is a parameter that may provide a trade-off:
  A higher value of M allows detecting very precisely if there is a radio jammer, but may introduce latency, as a greater number of blanked subcarriers is used in computing the average power.
  A smaller value of M may not allow detecting very precisely if there is a radio jammer but may give an indication very quickly. In other words, the detection may become faster as the value of M decreases, and slower as the value of M increases.

In an embodiment, the determination utilizes two different values of M. Thus, in block 504, the average power may be computed for two different M values, and the comparison of block 506 may be performed for average power values obtained using two different values of M. So, for example, the algorithm shown in FIG. 5 may also be applied in parallel with two different values of M, for instance $M_1$ and $M_2$, with $M_1<M_2$. For example, the network may cause applying more drastic anti-jamming actions when $M=M_2$. For example:
  $M=M_1$, block 512 may comprise, for instance, implementing jamming-interference mitigation techniques like power control, joint transmission and/or reception;
  $M=M_2$, block 512 may comprise, for instance, informing the authorities.

In an embodiment, in block 504, first average power is computed for a first number ($M_1$) of blanked subcarriers and second average power is computed for a second number ($M_2$) of blanked subcarriers. As noted above, $M_1<M_2$.

In an embodiment, if the first average power exceeds a threshold, a first set of actions is triggered. If the second average power exceeds the threshold, a second set of actions may be triggered, wherein the first and second set of actions are different. These action sets may be performed as in block 512, for example. For example, as discussed above, these may be different actions targeted to mitigate influence of the radio jamming. It may be beneficial to initiate mitigative actions based on the first average power (i.e. determined faster) but validate these mitigative actions with the more accurate second average power. That is, if the second average power value does not exceed the threshold, the first set of actions may be cancelled, for example.

In an embodiment, if the first average power exceeds a threshold, the first set of actions is triggered (e.g. as in block 512). After determining that the first average power exceeds the threshold, determining whether or not the second average power exceeds the threshold. If the second average power exceeds the threshold, continuing the first set of actions; otherwise cancelling the first set of actions. These actions may be performed by the control network element, for example. So, in principle, radio jamming may be detected (block 508) if both first and second average power values exceed the threshold, but so that initial detection is performed based on first average power and validation based on second average power.

According to an embodiment, the process further comprises determining direction of the radio jamming signal and/or location of the radio jammer (e.g. radio jammer 190). This is depicted with optional block 514 in FIG. 5. From block 514 the process may continue to END or to applying anti-jamming techniques, such as indicating the authorities or other personnel the location or direction of the radio jammer. The process may come to block 514 from block 508, for example. It is also noted that blocks 514 and/or 512 may be optional. Block 514 may be performed by, for example, first network element or the control network element. So, in order to better identify the location of the jammer (e.g. for security personnel and/or authorities being able to remove it) the blanked subcarriers may be used for direction of arrival estimation in case there are Z number of multiple antennas available. Z may be a positive integer number (e.g. 1, 2, 3, . . . ). This may be achieved by computing an empirical spatial sample covariance with dimension Z×Z by summing up a larger number of observations on each available blanked OFDM resource element. For example, in the case of private network, those blanked resources may not be active and regulation may cause the neighboring networks to have low or not notable power levels. Thus, the dominant power contained in those interference measurement samples may originate from the radio jammer. Then direction of arrival estimation techniques can be used, e.g. strongest beam, estimation of signal parameters via rotational invariance techniques (ESPRIT), MUltiple SIgnal Classification (MUSIC) etc. If multiple antenna arrays e.g. from multiple network nodes are used, triangulation methods may be used to locate the radio jammer.

Let us then discuss some embodiments with reference to FIGS. 6A, 6B, 7A, 7B, and 7C depicting signal diagrams according to some embodiments. Each Figure shows a control network element 610 (which may be similar to the control network element discussed above e.g. with reference to FIGS. 2 and 3, e.g. CU 108), a network node 620 (e.g. network node 104 or 182), and UE 630 (e.g. UE 100 or UE 102).

In block 642, the control network element 610 may determine a pseudorandom algorithm.

In block 644, the control network element 610 may transmit the pseudorandom algorithm to network node 620.

As noted above, the pseudorandom algorithm may refer here to pseudorandom algorithm or more precisely pseudorandom algorithm information that comprises a pseudorandom generator and a seed. Based on the pseudorandom algorithm transmitted in block 644, the network node 620 may determine, in block 646, blanked subcarrier index data. The blanked subcarrier index data indicates the one or more blanked subcarriers in the one or more radio symbols (i.e. blanking pattern). Based on this information the network node 620 may either perform downlink (DL) transmission (see FIGS. 7A to 7C) or configure UE 630 uplink (UL) transmission (see FIGS. 6A to 6B) so that there are blanked subcarrier(s) which can be measured for interference.

It is beneficial to avoid or at least minimize the number of any signal transmitted by legitimate devices (e.g. network node(s) or UE(s)) on the blanked subcarriers. Therefore, for each OFDM symbol, it is beneficial that all transmitters blank the same set of subcarriers. In order to achieve this, it may be beneficial to meet the following rules:

The network nodes know in advance (i.e. prior to the UL/DL transmission(s)) which pseudorandom generator is used;

The pseudorandom sequence seed is shared on the backhaul network (e.g. F1 or Xn interface together with the generator or separately (see block 644)): for instance, in the MLS example (i.e. FIG. 4C) the seed is represented by the initial sequence $x_0, x_1, \ldots, x_{L-1}$ of L bits;

The network nodes are time-aligned, hence have a certain level of synchronization to guarantee or at least improve the probability that the same blanking happens at the same time instant, thus OFDM symbol, over all the network nodes.

Also, as the used algorithm may be pseudorandom, a radio jammer may theoretically listen to the transmission, learn the seed and try to predict the blanked subcarrier in the upcoming OFDM symbols. To circumvent those attacks, it is further proposed that a long enough seed is utilized. For example, with reference to FIG. 4C, with just L=32 bits it is possible to generate a pseudorandom sequence of length $2^{32}-1 \approx 10^9$ bits. However, the proposed solution works with shorter pseudorandom sequences as well but increasing the length may further improve the solution to be even more robust for detecting radio jammers.

Another beneficial way may be to update the pseudorandom algorithm by the control network element 610. For example, this updated algorithm information may be transmitted from the control network element 610 to the network node 620. The update message may update the seed (i.e. different seed) and/or the generator (i.e. a use of different generator). For example, the entity receiving the update message including the updated information may update information stored in its internal memory based on the update message. So, for example, if a certain seed is stored and available to the network node 620, the update message may comprise or indicate a new seed. Based on this update message the seed may be updated to the new seed by, for example, overwriting the previous seed with the new seed. Similar method could be used for updating the generator. Such updates may further enhance the robustness of the solution and make it even harder for attackers to adapt to the used pseudorandom blanking pattern(s). It is noted that when the algorithm information changes, it may generate different blanking patterns as is known by the skilled person.

In an embodiment, the update message is transmitted regularly from the element 610 to the node 620. Regularity may mean a certain time interval, e.g. every T seconds or minutes.

In an embodiment, the update message only updates the seed. Thus, the generator may remain constant in this simple embodiment.

For example, to update the seed and the pseudorandom generator (e.g. regularly), the control network element 610 may select a new pseudorandom generator from a set of pseudorandom generators available at the network node 620, and indicate the pseudorandom generator to the node 620 (e.g. with S bits when the set of generators are indexed). The control network element 610 may further compute a new seed and share it with the network node 620. This information may be transmitted in one or more messages (e.g. see block 644) from the control network element 610 to the network node 620. In one example, control network element 610 may share with the network node 620 every T seconds or minutes S+L bits (i.e. pseudorandom generator index amongst the set of generators and a new seed for the generator). For example, this may be done via NR Xn interface.

It should be understood that the update message (e.g. S+L bits every T seconds or minutes) may be carried by a standardized or propriety signal(s) from the control network element 610 to the network node 620. If a functional DU-CU split is used in the system and the denoted network nodes are 5G DUs, then the signaling may go via F1 interface from CU to the DUs. If the invention operates the jamming detection functionality in a master-slave architecture as described above, then the signaling may use the Xn interface. It is noted that although in the signal diagrams 6A to 7C only one network node 620 is shown, the same information may be shared to a plurality of network nodes as discussed above.

In an embodiment, the control network element 610 is configured to compute the blanked subcarrier index data (i.e. block 646). In this example embodiment, the control network element 610 may transmit the blanked subcarrier index data to the network node 620 (and possibly to other network nodes). For example, this way the network node 620 does not need to compute the blanked subcarrier index data by itself, and thus the pseudorandom algorithm may be known by the control network element 610 alone or at least it may not be shared with the network nodes. In this example, the updating the blanking pattern may require sharing every T seconds or minutes $2^L-1$ bits (according to the example generator of FIG. 4C). For higher L values, it may be beneficial to indicate the pseudorandom algorithm information instead of computing the blanking pattern at the control network element 610 and transmitting said blanked subcarrier index data as the amount of data increases exponentially with L.

Figure 6A:
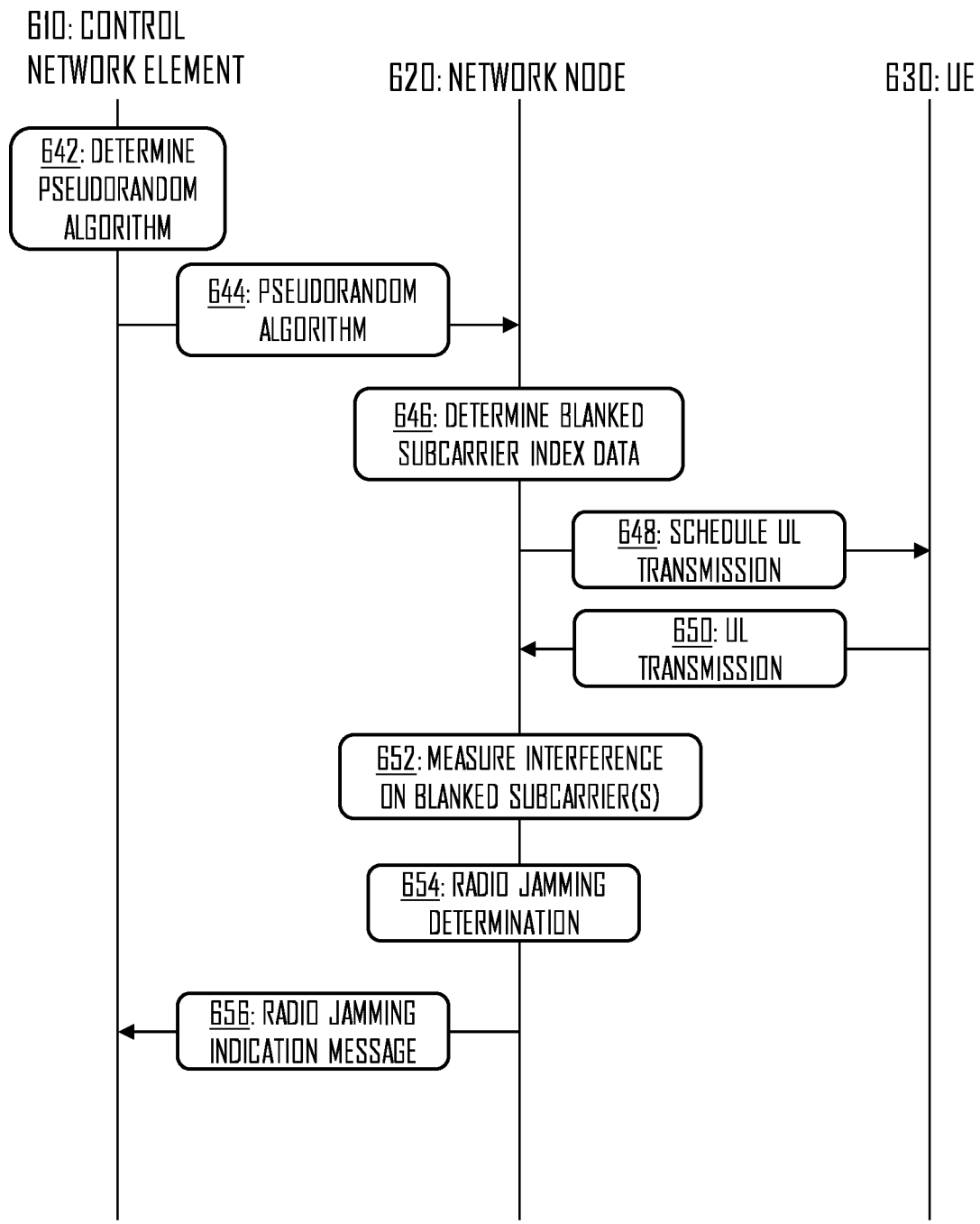
Figure 6B:
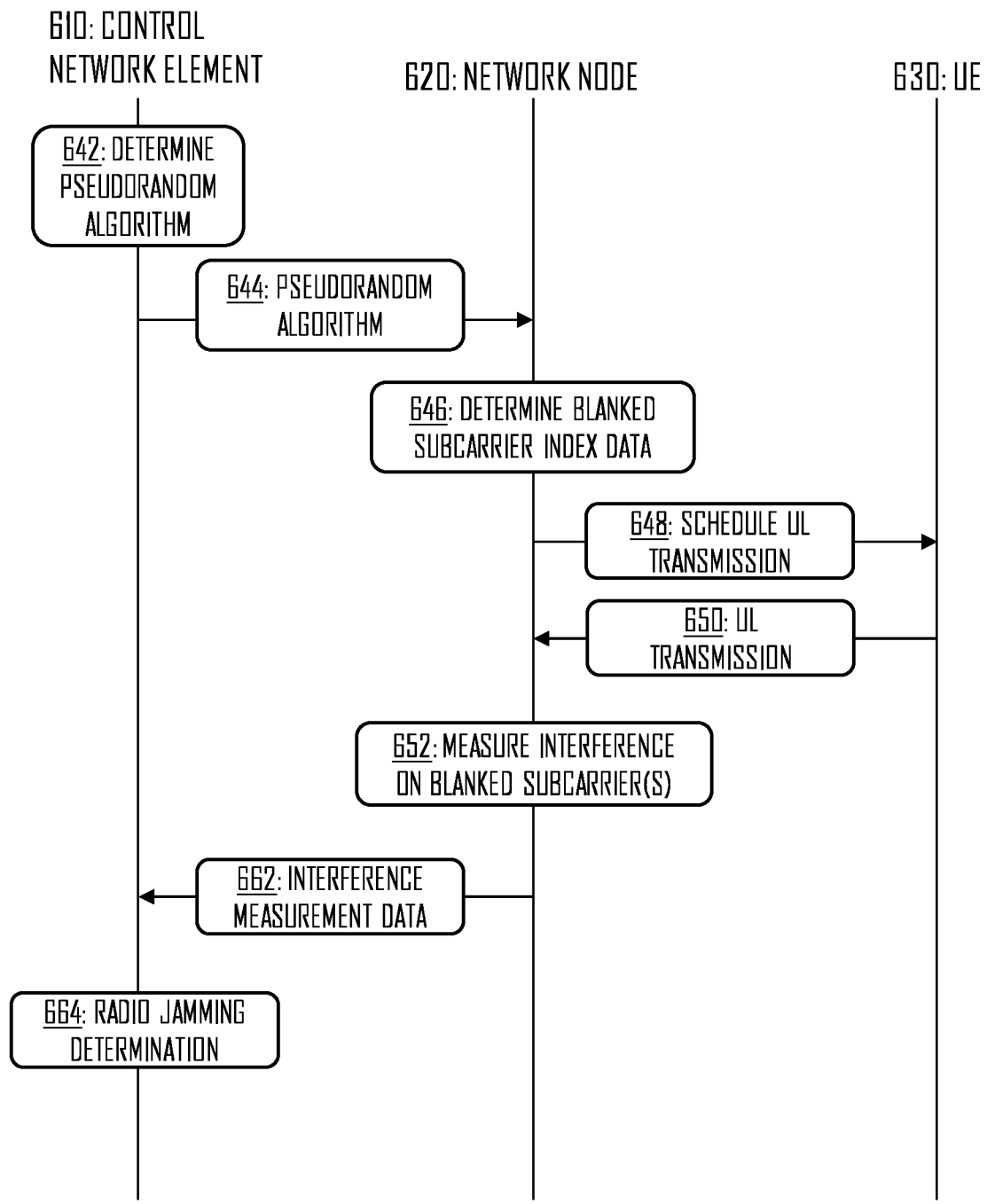

Let us then draw our attention to some embodiments of FIGS. 6A and 6B. Based on the blanked subcarrier index data, the network node 620 may schedule (block 648) the UE 630 (or UEs) to blank transmission on the one or more blanked subcarriers indicated by the blanked subcarrier index data. It is noted that this scheduling in block 648 may be regular scheduling, but in a way that it indicates the blanked subcarriers to the UE 630. For example, these could be explicitly or implicitly indicated. For example, in explicit indication, each blanked subcarrier could be indicated with an index. In an implicit indication, the radio resources could be given so that the blanked subcarriers are not part of the giver resources.

Hence, in block 650, the UE 630 may perform transmission on the scheduled radio resources so that the blanked subcarriers are indeed blanked (i.e. not utilized by the UE 630 for the transmission).

In block 652, the network node 620 may perform the interference measurement on the blanked subcarrier(s). So, this measurement may take place at the time of the transmission of bock 650. It is also possible that, for determining the noise, interference is measured for used subcarriers (i.e. non-blanked subcarriers) also.

According to an embodiment of FIG. 6A, based on the interference measurement of block 652, the network node 620 outputs the interference measurement data to a radio jamming determination unit, wherein, in block 654, the radio jamming determination unit of the network node 620 determines whether or not there is radio jamming. This may be referred to as radio jamming detection.

According to an embodiment, if radio jamming is detected (or in response to detecting radio jamming), the network node 620 transmits a radio jamming indication message (block 656) to the control network element 610. Thus, the control network element 610 may become aware of radio jamming, and thus possibly initiate mitigative actions (e.g. as in FIG. 5). If no radio jamming is detected, the indication message is not necessarily transmitted. However, it may be beneficial to transmit the indication message also in the case that no radio jamming is detected. In such case the control network element 610 may become aware that there is no radio jamming detected, or at least the indicator has not detected radio jamming. However, there may be more than one source of information for the unit that determines whether there is radio jamming or not (e.g. multiple UEs and/or multiple network nodes).

According to an embodiment of FIG. 6B, based on the interference measurement, the network node 620 may obtain interference measurement data as in the embodiment of FIG. 6A. However, in this example, the interference measurement data may be transmitted, in block 662, to the control network element 610. Hence, in block 664, the control network element 610 may perform the radio jamming determination/detection. This may be performed similarly as in block 654 by the network node 620. However, the control network element 610 may obtain measurement data from a plurality of network nodes, and hence the determination may be based on interference measurement data received from a plurality of network nodes, and possibly regarding a plurality of transmissions. This may mean even more accurate radio jamming determination. It is also pointed out that in the example of FIG. 6A, some network nodes may indicate radio jamming and some others may not. In such case, the conclusive decision may be performed by the control network element 610. For example, if majority or at least one network node(s) indicates radio jamming, the control network element 610 may determine that there is indeed radio jamming and perform necessary actions. Similar deduction may be performed in the example of FIG. 6B also.

Figure 7A:
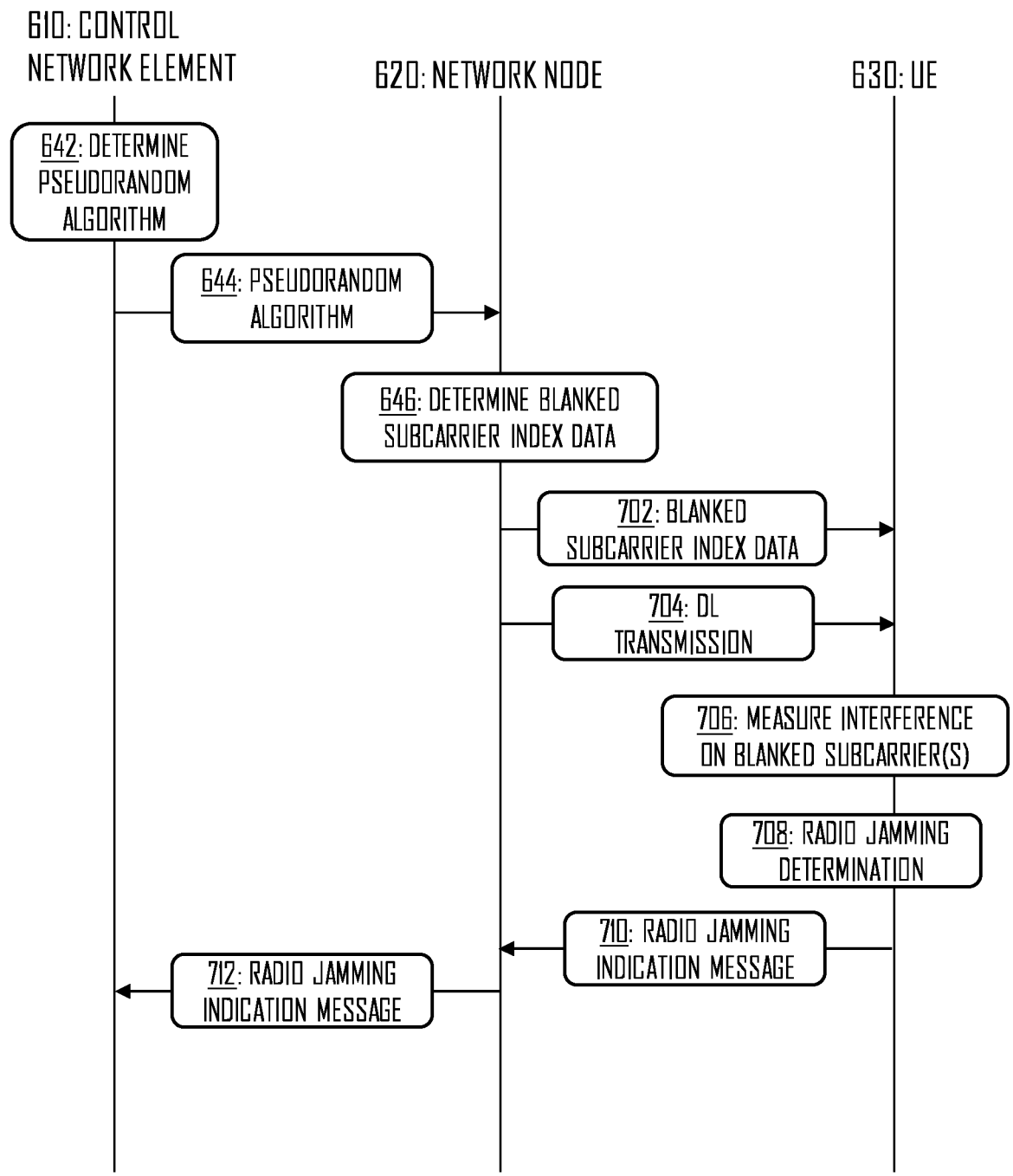
Figure 7B:
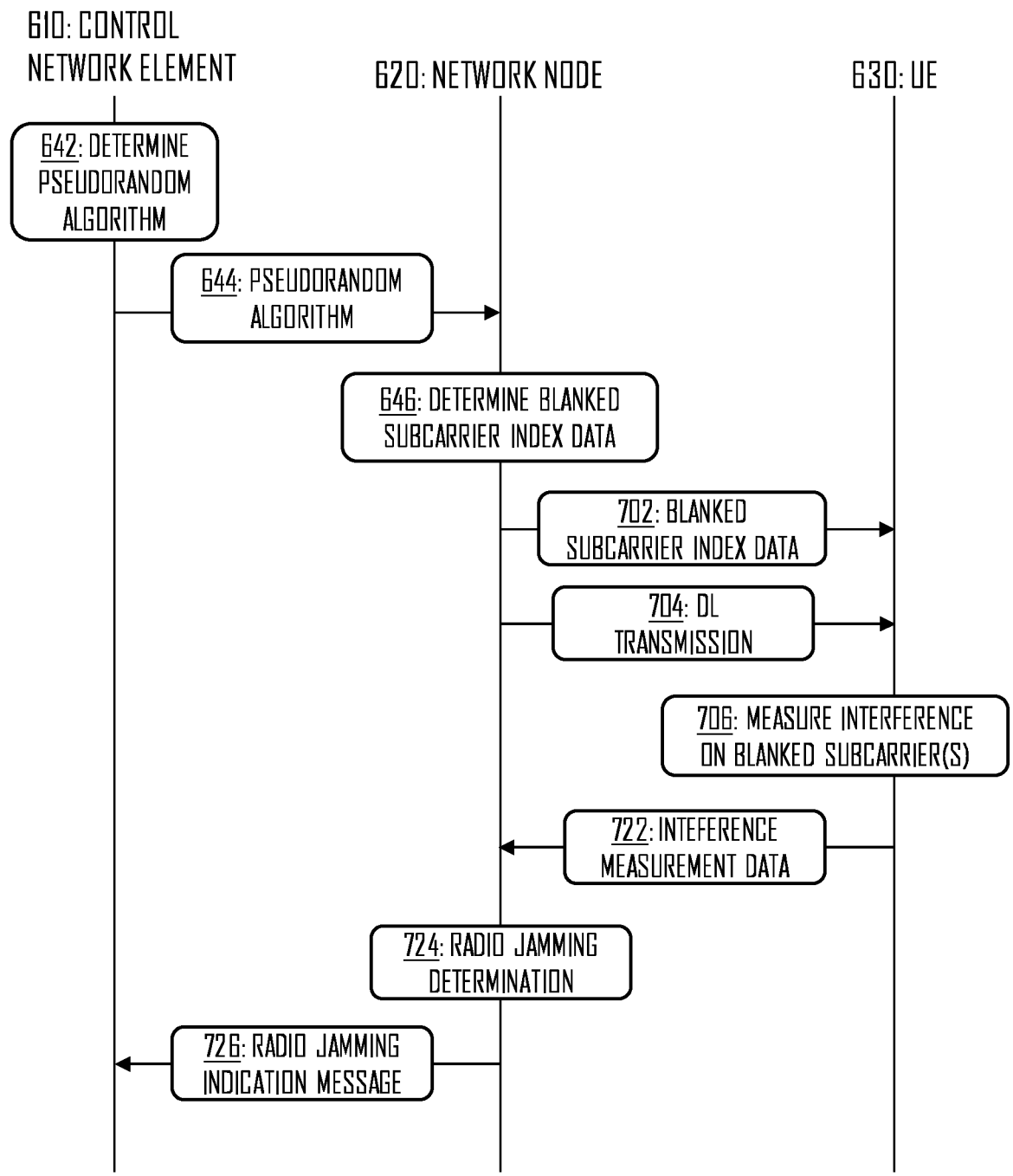
Figure 7C:
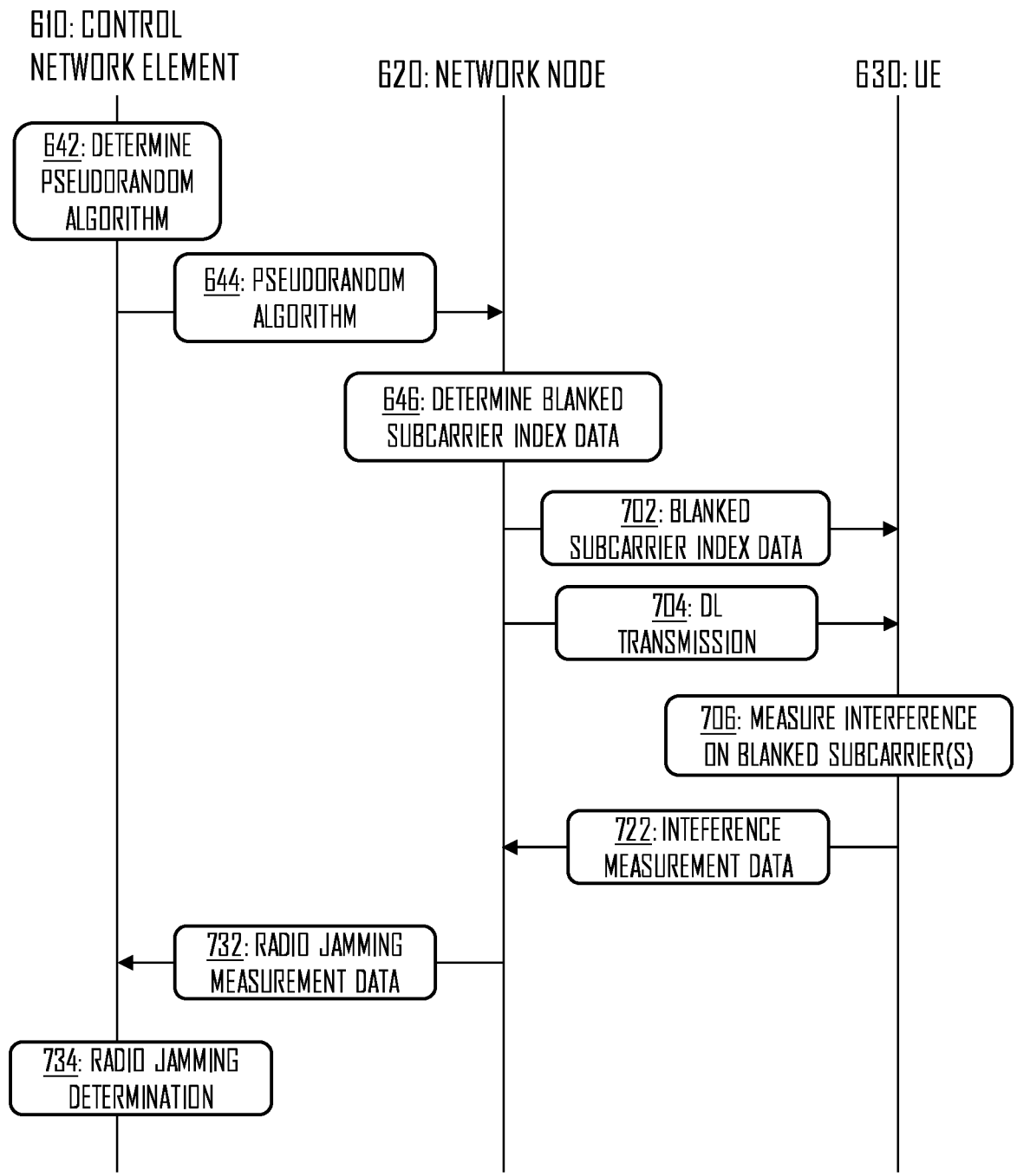

Let us then discuss some embodiments related to DL transmission scenario with respect to FIGS. 7A, 7B, and 7C. Referring to FIGS. 7A, 7B, and 7C, in block 702, the network node 620 may indicate the blanked subcarrier index data to the UE 630 (or UEs). This indication may be performed in a form of a configuration message or signaling, for example. This may be different from the examples of FIGS. 6A and 6B in which the subcarrier index data may not necessarily be needed to be indicated to the UE as the UE may be scheduled not to use the blanked subcarriers. However, in this example, as the network node 620 is performing a DL transmission, in block 704, to the UE 630, the UE 630 may perform interference measurement(s) on the blanked subcarrier(s) (block 706) as it is aware of the blanked subcarrier(s) (i.e. indication of block 702). The blanked subcarrier index data may comprise index of the subcarriers that are blanked. It is also possible that the interference is measured on all subcarriers or at least more subcarriers than only the blanked subcarriers. This way it may be possible to obtain information on the noise level, for example.

Now there may be at least three different ways to utilize the performed interference measurement(s) by the UE 630. According to an embodiment, with reference to FIG. 7A, the UE 630 performs the radio jamming determination (block 708) based on the interference measurement data obtained via the interference measurement(s) of block 706.

In block 710, the radio jamming indication message may be transmitted from the UE 630 to the network node 620. In block 712, a radio jamming indication message (same message or similar message as in block 710) may be transmitted from the network node 620 to the control network element 610. The radio jamming indication message may be similar as described above, i.e. indicates radio jamming or no radio jamming based on the determination of block 708. However, as explained above, in the case of no radio jamming, the message is not necessarily transmitted at all. Similarly, necessary actions may take place depending on the detection.

According to an embodiment, with reference to FIGS. 7B and 7C, the interference measurement data may be transmitted from the UE 630 to the network node 620 (block 722 of FIGS. 7B and 7C). Thus, the interference determination may be performed at the network node 620 (block 724 of FIG. 7B) or at the control network element 610 (block 734 of FIG. 7C).

Based on block 724, the radio jamming indication message may be transmitted from the network node 620 to the control network element 610 (block 726 of FIG. 7B). The determination in block 724 may be based on interference measurement data received from a plurality of UEs, for example.

In the example of FIG. 7C, the network node 620 may relay the interference measurement data from the UE 630 to the control network element 610 (block 732 of FIG. 7C). Thus, the radio jamming determination of block 734 may be based on interference measurement data from a plurality of network nodes which each have received the interference measurement data from a plurality of UEs, for example.

So, the radio jamming determination may be performed at each UE, at each network node, and/or at control network element coordinating the network nodes. The radio jamming determination (block 664, 734) performed by a control network element may be even more precise than the one performed by network node (block 654, 724) which may in turn be even more precise than the detection performed by a single UE (block 708), as control network element may receive data from multiple network nodes and each network node may receive data from multiple UEs. It is also noted that it may be possible to combine the different detection methods: i.e. radio jamming determination may be performed at the UE, network node and/or control network element in some embodiments. On the other hand, it appears straightforward that in case of DL transmission, the determination may be easily implemented at the UE side, as the UEs measure the IPVs on the blanked subcarriers, whereas in case of uplink transmission, the determination may be easily implemented at the network node side, as now the network nodes measure the IPVs.

In an embodiment, the interference measurement data comprises measured one or more IPV.

In an embodiment, the radio jamming indication message (block 656, 710, 712, and/or 726) indicates either one of the following states: no radio jamming, radio jamming. For example, the indication message may be a one-bit message. For example, the UE 630 may indicate with the one-bit message whether or not it has detected radio jamming.

At this point it is also pointed out that the interference information discussed e.g. with reference to FIG. 3 may comprise an explicit indication of interference (e.g. radio jamming indication message) or interference measurement data. It may be possible to include both in said interference information. Based on said interference information, the control network element may determine whether or not radio jamming takes place.

Figure 8:
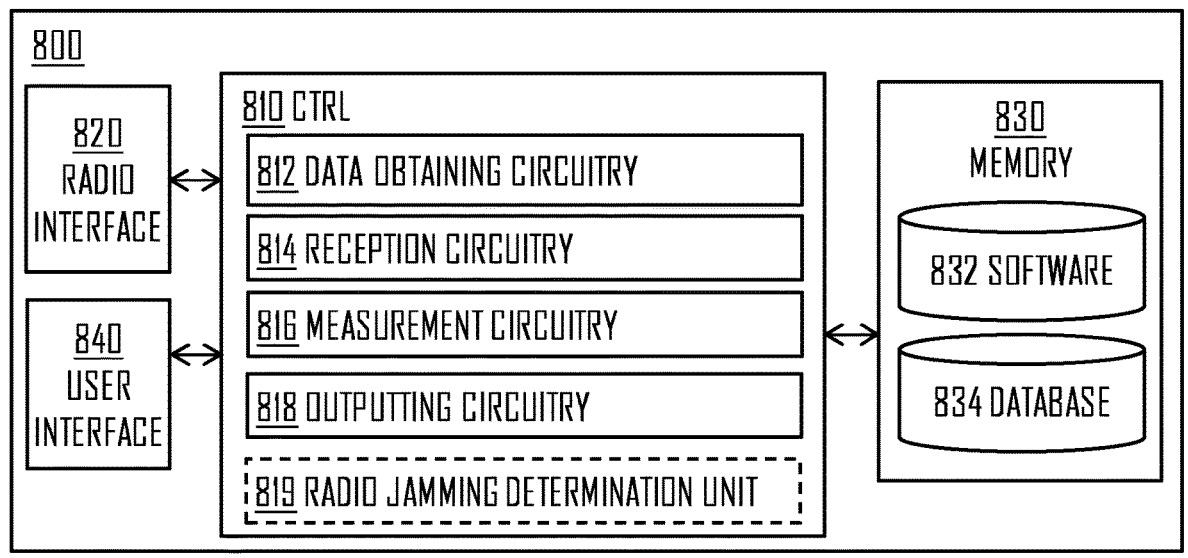
FIGS. 8 and 9 illustrate apparatuses according to some embodiments.
Figure 9:
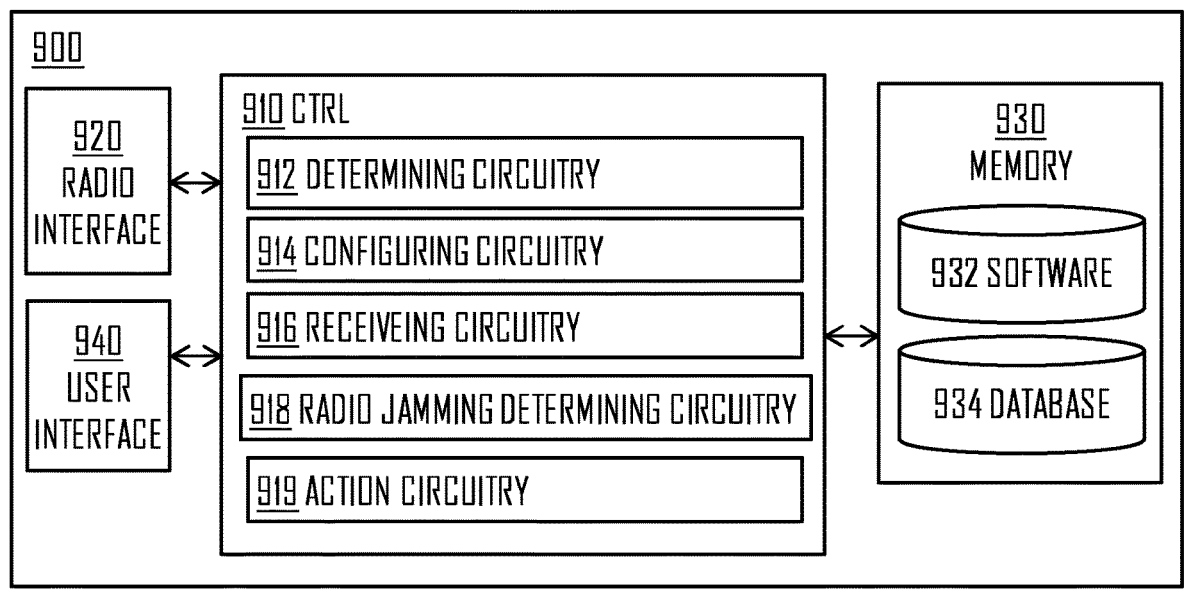

FIGS. 8 and 9 provide apparatuses 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments of FIGS. 1 to 7C, or operations thereof.

Referring to FIGS. 8 and 9, the memory 830, 930, may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data. For example, the pseudorandom algorithm information may be stored in the database.

The apparatus 800, 900 may further comprise radio interface (TRX) 820, 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. TRX may provide access to F1 and/or Xn interface, for example, and/or provide UL/DL communication capability.

The apparatus 800, 900 may comprise user interface 840, 940 comprising, for example, at least one keypad, a microphone, a touch display, a display, a speaker, etc. The user interface 840, 940 may be used to control the respective apparatus by a user of the apparatus 800, 900.

In an embodiment, the apparatus 800 may be or be comprised in a network element, e.g. the first network element performing the method described above (e.g. see FIG. 2). For example, the apparatus 800 may be or be comprised in the network node 182, 104, or UE 100 or UE 102. According to an embodiment, the apparatus is or is comprised in the network node 620.

In an embodiment, the apparatus 900 may be or be comprised in a control network element, e.g. the control network element performing the method described above (e.g. see FIG. 3). For example, the apparatus 900 may be or be comprised in the control network element 610 or CU 108.

According to an embodiment, with reference to FIG. 8, the control circuitry 810 comprises a data obtaining circuitry 812 configured at least to obtain blanked subcarrier index data indicating one or more blanked subcarriers in a time-frequency resource grid; a reception circuitry 814 configured at least to initiate reception of a transmission from a second network element of the wireless communication network on said time-frequency resource grid; a measurement circuitry 816 configured at least to cause performing an interference measurement on said one or more blanked subcarriers to obtain interference measurement data on said one or more blanked subcarriers; and an outputting circuitry 818 configured at least to output the interference measurement data for detecting a presence of radio jamming.

According to an embodiment, the outputting circuitry 818 outputs the interference measurement data to a radio jamming determination unit 819 of the apparatus 800. The radio jamming determination unit 819 may perform the determination whether or not there is radio jamming based on said data. Alternatively or additionally, the outputting circuitry 818 may output said data to the control network element (e.g. CU 108) or apparatus 900, wherein the radio jamming determination/detection is performed at the control network element (e.g. by circuitry 918).

According to an embodiment, with reference to FIG. 9, the control circuitry 910 comprises a determining circuitry 912 configured at least to determine a blanking pattern information for blanking one or more subcarriers of a time-frequency resource grid; a configuring circuitry 914 configured at least to configure a plurality of network nodes of the wireless communication network to utilize said blanking pattern information to blank the one or more subcarriers; a receiving circuitry 916 configured at least to receive interference information from a network node of the plurality of network nodes, the interference information obtained based on one or more measurements performed on the blanked one or more subcarriers; a radio jamming determining circuitry 918 configured at least to determine a presence of radio jamming based on the received interference information; and an action circuitry 919 configured at least to initiate, in case the presence of radio jamming is determined, one or more actions to mitigate the determined radio jamming.

In an embodiment, at least some of the functionalities of the apparatus 800, 900 may be shared between two physically separate devices, forming one operational entity. Therefore, the apparatus 800, 900 may be seen to depict the operational entity comprising one or more physically separate devices for executing at least some of the described processes. Thus, the apparatus 800, 900 utilizing such shared architecture, may comprise a remote control unit (RCU), such as a host computer or a server computer, operatively coupled (e.g. via a wireless or wired network) to a remote radio head (RRH), such as a Transmission Point (TRP), located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising a plurality of apparatuses 800 and one or more apparatuses 900.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7C may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7C or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7C, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7C may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
    at least one processor; and
    at least one memory including program code, wherein the at least one memory and the computer program code are configured, with the at least one processor, to cause the apparatus to perform:
    receiving pseudorandom algorithm information from a control network element of a wireless communication network;
    determining blanked subcarrier index data based on the received pseudorandom algorithm information, the blanked subcarrier index data indicating one or more blanked subcarriers in a time-frequency resource grid, wherein the blanked subcarrier index data is generated utilizing a pseudorandom algorithm information determined by the control network element of the wireless communication network;
    initiating reception of a transmission from a network element of the wireless communication network on said time-frequency resource grid;
    causing performing an interference measurement on said one or more blanked subcarrier to obtain interference measurement data on said one or more blanked subcarriers;
    outputting the interference measurement data for detecting a presence of radio jamming; and
    transmitting the interference measurement data for detecting the presence of radio jamming to the control network element.

2. The apparatus of claim 1, wherein the at least one memory and the computer program code are configured, with the at least one processor, to cause the apparatus further to perform:
performing the detection of the presence of radio jamming based on the outputted interference measurement data.

3. The apparatus of claim 1, wherein the blanked subcarrier index data indicates one or more blanked subcarriers in a plurality of radio symbols for communicating between the apparatus and the network element.

4. The apparatus of claim 1, wherein the at least one memory and the computer program code are configured, with the at least one processor, to cause the apparatus further to perform:
receiving an update message from the control network element, the update message for updating the pseudorandom algorithm information.

5. The apparatus of claim 1, wherein the apparatus comprises a network node and the network element comprises a user equipment, and wherein the at least one memory and the computer program code are configured, with the at least one processor, to cause the apparatus further to perform:
scheduling, based on the obtained blanked subcarrier index data, the user equipment to blank transmission on the one or more blanked subcarriers.

6. The apparatus of claim 1, wherein the one or more blanked subcarriers denote one or more blanked physical resource blocks.

7. A method for a first network element of a wireless communication network, the method comprising:
receiving pseudorandom algorithm information from a control network element of the wireless communication network;
determining blanked subcarrier index data based on the received pseudorandom algorithm information, the blanked subcarrier index data indicating one or more blanked subcarriers in a time-frequency resource grid, wherein the blanked subcarrier index data is generated utilizing a pseudorandom algorithm information determined by a control network element of the wireless communication network;
initiating reception of a transmission from a second network element of the wireless communication network on said time-frequency resource grid;
causing performing an interference measurement on said one or more blanked subcarriers to obtain interference measurement data on said one or more blanked subcarriers;
outputting the interference measurement data for detecting a presence of radio jamming; and
transmitting the interference measurement data for detecting the presence of radio jamming to the control network element.

8. The method of claim 7, further comprising:
performing the detection of the presence of radio jamming based on the outputted interference measurement data.

9. The method of claim 7, wherein the blanked subcarrier index data indicates one or more blanked subcarriers in a plurality of radio symbols for communicating between the first network element and the second network element.

10. The method of claim 7, further comprising receiving an update message from the control network element, the update message for updating the pseudorandom algorithm information.

11. The method of claim 7, further comprising scheduling, based on the obtained blanked subcarrier index data, the user equipment to blank transmission on the one or more blanked subcarriers.

12. The method of claim 7, wherein the one or more blanked subcarriers denote one or more blanked physical resource blocks.

* * * * *